United States Patent
Fang

(10) Patent No.: US 9,197,136 B2
(45) Date of Patent: Nov. 24, 2015

(54) SWITCHED-MODE POWER SUPPLY FOR PROVIDING A STABLE OUTPUT VOLTAGE

(71) Applicant: YOTTACONTROL CO., Kaohsiung (TW)

(72) Inventor: Cheng-Jen Fang, Kaohsiung (TW)

(73) Assignee: YOTTACONTROL CO. (TW)

(*) Notice: Subject to any disclaimer, the term of this patent is extended or adjusted under 35 U.S.C. 154(b) by 251 days.

(21) Appl. No.: 14/074,912

(22) Filed: Nov. 8, 2013

(65) Prior Publication Data

US 2015/0055379 A1 Feb. 26, 2015

(30) Foreign Application Priority Data

Aug. 23, 2013 (TW) .............................. 102130192 A

(51) Int. Cl.
H02M 3/335 (2006.01)
H02M 1/34 (2007.01)

(52) U.S. Cl.
CPC ............ *H02M 3/33592* (2013.01); *H02M 1/34* (2013.01); *H02M 3/33569* (2013.01); *H02M 2001/342* (2013.01)

(58) Field of Classification Search
CPC ........................................................ H02M 1/34
See application file for complete search history.

(56) References Cited

U.S. PATENT DOCUMENTS

| | | | | |
|---|---|---|---|---|
| 4,318,165 A * | 3/1982 | Kornrumpf | ....... | H02M 3/33507 219/761 |
| 5,260,607 A * | 11/1993 | Kinbara | ....... | H02M 1/34 327/427 |
| 5,828,559 A * | 10/1998 | Chen | ....... | H02M 1/34 363/132 |
| 5,917,716 A * | 6/1999 | Cho | ....... | H02H 7/1227 348/E5.127 |
| 6,069,802 A * | 5/2000 | Priegnitz | ....... | H02M 1/34 323/907 |
| 6,115,271 A * | 9/2000 | Mo | ....... | H02M 1/34 363/21.12 |
| 6,142,130 A * | 11/2000 | Ward | ....... | F02P 3/005 123/606 |
| 6,473,318 B1 * | 10/2002 | Qian | ....... | H02M 1/34 363/21.12 |
| 2003/0147264 A1 * | 8/2003 | Jinno | ....... | H02M 1/34 363/20 |
| 2006/0104097 A1 * | 5/2006 | Tsuruya | ....... | H02M 1/16 363/55 |
| 2006/0187688 A1 * | 8/2006 | Tsuruya | ....... | H01F 27/38 363/56.12 |
| 2006/0226816 A1 * | 10/2006 | Wai | ....... | H02M 1/34 323/222 |
| 2009/0154204 A1 * | 6/2009 | Taylor | ....... | H02M 3/33592 363/52 |
| 2009/0268489 A1 * | 10/2009 | Lin | ....... | H02M 1/34 363/50 |
| 2011/0103102 A1 * | 5/2011 | Chiang | ....... | H02M 3/335 363/21.13 |
| 2011/0216557 A1 * | 9/2011 | Fujiyoshi | ....... | H02M 1/34 363/21.09 |
| 2012/0033457 A1 * | 2/2012 | Kim | ....... | H02M 3/33553 363/21.04 |
| 2012/0127762 A1 * | 5/2012 | Reddy | ....... | H02M 3/33592 363/21.04 |
| 2014/0362613 A1 * | 12/2014 | Park | ....... | H02M 1/34 363/21.16 |

* cited by examiner

*Primary Examiner* — Timothy J Dole
*Assistant Examiner* — Yusef Ahmed
(74) *Attorney, Agent, or Firm* — Hershkovitz & Associates, PLLC; Abe Hershkovitz

(57) ABSTRACT

The present invention is a switched-mode power supply for providing a stable output voltage. An excitation winding, a vice-output winding and an active snubber circuit are connected to a primary side of a flyback-based transformer. A main-output winding is connected to a secondary side of the transformer. A primary-side PWM controller and a secondary-side PWM controller are respectively connected to the primary side and the secondary side of the transformer. By a time-shared-energy-transfer method, the main-output winding and the vice-output winding are controlled to sequentially extract demand electricity from the transformer during a same switching cycle. Additionally, by a time-shared-energy transformation, the output voltage on the secondary side of the transformer is stabilized to be provided between a stable minimal voltage and a preset higher voltage for satisfying a heavy-loading status and a light-loading status.

12 Claims, 11 Drawing Sheets

(A)

(B)

(A)

(B)

(A)

(B)

SWITCHED-MODE POWER SUPPLY FOR PROVIDING A STABLE OUTPUT VOLTAGE

BACKGROUND OF THE INVENTION

1. Field of the Invention

The present invention relates to a switched-mode power supply (SMPS), and more particularly to a power supply with a flyback-based power converter for providing a stable output voltage unaffected by a heavy load or a light load.

2. Description of Related Art

A switched-mode power supply (SMPS) is commonly used in power supply systems. The switched-mode power supply provides activating signals and inactivating signals to a switch by using Pulse Width Modulation (PWM) control method. The switch is thus alternately turned on and turned off. The switched-mode power supply can cooperate with peripheral devices to convert an input power to a demand DC output power.

For the switched-mode power supply, when a load is operated under a heavy-loading status or when the power supply has to provide a higher voltage, to provide a stable output power is easier to be accomplished. On the contrary, when the load is operated under a light-loading status or when the power supply has to provide a lower voltage, to provide a stable output power is much more difficult. Theoretically, the power supply can reduce duty cycles for the PWM control signal to provide a low output voltage. For example, a waveform A in FIG. 11 shows a PWM control signal with longer duty cycle, and a waveform B in FIG. 11 shows a PWM control signal with shorter duty cycle. Practically, when the duty cycle becomes shorter, the PWM control signal becomes weaker. When the PWM control signal approximates system noises, the PWM control signal is difficult to be stabilized, and the output voltage correspondingly floats. In addition, a minimal activating time of the switch is limited. When the duty cycle is lower than the minimal activating time, the output voltage can hardly be controlled.

There are two conventional methods to control the switched-mode power supply providing a low voltage.

(1) Frequency-Reducing Method

With reference to a waveform A in FIG. 12, a higher switching frequency is used to control the switch when the load is operated under heavy-loading status or when the power supply has to provide a high voltage. With reference to a waveform B in FIG. 12, a lower switching frequency is used to control the switch when the load is operated under a light-loading status or when the power supply has to provide a low voltage. However, if the switching frequency is reduced to be lower than a sonic frequency (20 KHz), the power supply will produce mechanical noise. Hence, in order to avoid the mechanical noise, the output voltage cannot be provided at a very low voltage.

(2) Burst-Mode Method

With reference to a waveform A in FIG. 13, the switch is controlled by the burst-mode method when the load is operated under the light-loading status or when the power supply has to provide a very low voltage. Multiple cycles are omitted on purpose, such that the switch is not activated during the cycles. The switch is activated by burst-mode PWM control signals during a relatively short period of time. Although the frequency of the pulse signal is not changed, with reference to a waveform B in FIG. 13 showing an envelope curve of the burst-mode PWM control signal observed under a relatively long period of time, a frequency of the envelope curve is much lower. As a result, energy-storing elements in the conventional switched-mode power supply still produce mechanical noise.

SUMMARY OF THE INVENTION

The conventional switched-mode power supply cannot provide a stable voltage under the light-loading status or the low-voltage-output status. An objective of the present invention is to provide a switched-mode power supply. The power supply of the present invention can linearly control the output voltage to be between a very low minimal voltage Vmin and a higher preset voltage Vmax that is preset in the power supply. The power supply of the present invention can keep the switching frequency to the switch and can provide a stable voltage unaffected by the voltage level of the output voltage or the loading status.

The switched-mode power supply comprises a transformer, a primary-side switch, an active snubber circuit, a primary-side PWM controller, a secondary-side switch, a secondary-side-phase-compensation circuit, a secondary-side PWM controller, and a synchronization circuit.

The transformer has a primary side and a secondary side. The primary side has an excitation winding and a vice-output winding of Na turns. A first terminal of the excitation winding is connected to an input power and an input capacitor. The vice-output winding is connected to a primary-side-phase-compensation circuit via a vice-output diode. A cathode of the vice-output diode is connected to a power-saving capacitor that is grounded. The secondary side has a main-output winding of Ns turns. A ratio of turns of the transformer meets $$\left(Vs \times \frac{Na}{Ns}\right) < Va,$$

wherein Vs is a voltage of the main-output winding, and Va is a voltage of the vice-output winding.

The primary-side switch is connected between the excitation winding of the transformer and a ground in series.

The active snubber circuit has a first diode, a second diode, a third diode, a snubber capacitor, an energy-storing inductor and a snubber switch. The second diode, the energy-storing inductor and the third diode are sequentially connected in series and connected to the input power. The snubber capacitor has a first terminal connected to a node between the third diode and the energy-storing inductor, and a second terminal connected to a node between the primary-side switch and the excitation winding via the first diode. A cathode of the first diode is connected to the snubber capacitor. The snubber switch has a first terminal connected to a node between the snubber capacitor and the first diode, and a second terminal connected to the ground.

The primary-side pulse width modulation (PWM) controller is respectively connected to the snubber switch and the primary-side switch to respectively provide a first driving signal and a second driving signal to the snubber switch and the primary-side switch.

The secondary-side switch is connected between the main-output winding and an output terminal.

The secondary-side-phase-compensation circuit receives an output voltage from the output terminal and a setting command from outside, and compares the output voltage with the setting command.

The secondary-side PWM controller receives a comparison result from the secondary-side-phase-compensation circuit and provides a secondary-side-switch-driving signal to control the secondary-side switch.

The synchronization circuit is connected to the main-output winding to detect a voltage variation from the main-output winding and accordingly provides a synchronization signal to the secondary-side PWM controller according to the voltage variation.

The transformer transfers electricity from the primary side to the secondary side. Besides the excitation winding, the transformer has the vice-output winding on the primary side. The voltage on the vice-output winding is returned to control the primary-side switch. The snubber switch of the active snubber circuit is controlled by the current variation of the energy-storing inductor or the voltage variation of the energy-storing capacitor. The secondary side of the transformer has the individual secondary-side PWM controller. The secondary-side PWM controller is synchronized with the primary-side PWM controller. By using the time-shared-energy-transfer method, the main-output winding and the vice-output winding are controlled to sequentially extract demand electricity from the transformer during a same switching cycle.

The preset invention uses the active snubber circuit and the time-shared-energy-transfer method to control the output voltage on the main-output winding to be the minimal voltage Vmin or the higher preset voltage Vmax according to a loading status. The switching frequency of the output voltage is kept at a stable frequency. A skip-cycle is thus avoided.

DETAILED DESCRIPTION OF THE PREFERRED EMBODIMENT

Figure 1:
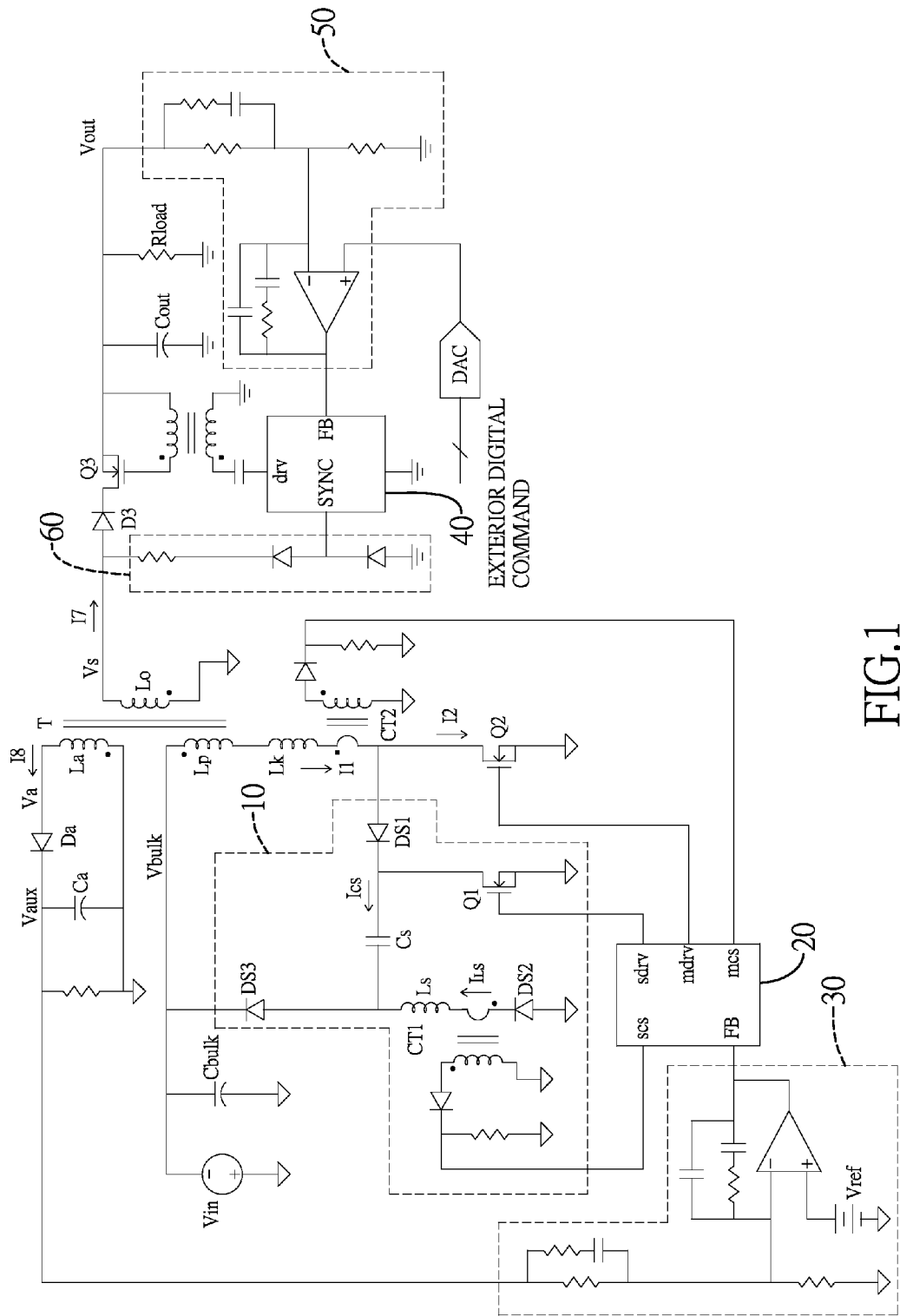
FIG. 1 is a detailed circuit diagram of a first embodiment of the present invention.

With reference to FIG. 1, the power supply of the present invention has a flyback power converter as a basic structure. The power supply mainly comprises a transformer T, a primary-side switch Q2, an activate snubber circuit 10, a primary-side PWM (Pulse Width Modulation) controller 20, a primary-side-phase-compensation circuit 30, a secondary-side switch Q3, a secondary-side PWM controller 40 and a secondary-side-phase-compensation circuit 50. The primary-side switch Q2, the activate snubber circuit 10, the primary-side PWM controller 20, and the primary-side-phase-compensation circuit 30 are mounted to a primary side of the transformer T. The secondary-side switch Q3, the secondary-side PWM controller 40, and the secondary-side-phase-compensation circuit 50 are mounted to a secondary side of the transformer T.

The primary side of the transformer T comprises an excitation winding Lp of Np turns and a vice-output winding La of Na turns. A first terminal of the excitation winding Lp is connected to an input power Vin and an input capacitor Cbulk. A second terminal of the excitation winding Lp is connected to an inductor device in series. The inductor device represents a leakage inductor Lk of the transformer T. The secondary side of the transformer T comprises a main-output winding Lo of Ns turns. A ratio of turns of the transformer T meets $$\left(Vs \times \frac{Na}{Ns}\right) < Va$$

to realize an object of the time-shared-energy-transfer principle, wherein Vs is a voltage of the main-output winding Lo, and Va is a voltage of the vice-output winding La. Based on the ratio of turns of the transformer T, during each switching cycle, the main-output winding Lo is excited before the vice-output winding La is excited, such that the output windings Lo, La can produce a former activity procedure and a later activity procedure.

The primary-side switch Q2 is connected between the excitation winding Lp of the transformer T and a ground in series. A second current transformer CT2 can be connected between the primary-side switch Q2 and the excitation winding Lp for sensing an excitation current I1 flowing through the excitation winding Lp.

The active snubber circuit 10 is connected to the primary side of the transformer T. The active snubber circuit 10 comprises a first diode DS1, a second diode DS2, a third diode DS3, a snubber capacitor Cs, an energy-storing inductor Ls, a snubber switch Q1 and a first current transformer CT1. The second diode DS2, the energy-storing inductor Ls and the third inductor DS3 are sequentially connected in series and connected to the input power Vin. A terminal of the snubber capacitor Cs is connected to a node between the third diode DS3 and the energy-storing inductor Ls. Another terminal of the snubber capacitor Cs is connected to a node between the primary-side switch Q2 and the second current transformer CT2 via the first diode DS1. A cathode of the first diode DS1 is connected to the snubber capacitor Cs. A first terminal of the snubber switch Q1 is connected to a node between the snubber capacitor Cs and the first diode DS 1. A second terminal of the snubber switch Q1 is grounded. The first current transformer CT1 is connected to the energy-storing inductor Ls in series for sensing a current $I_{Ls}$ flowing through the energy-storing inductor Ls.

The primary-side PWM controller 20 is respectively connected to the snubber switch Q1 and the primary-side switch Q2 to respectively provide a first driving signal (sdrv) and a second driving signal (mdrv) to the snubber switch Q1 and the primary-side switch Q2. Two input terminals (scs)(mcs) of the primary-side PWM controller 20 respectively receive sensed results from the first current transformer CT1 and the second current transformer CT2. A feedback input terminal FB of the primary-side PWM controller 20 receives a feedback result from the primary-side-phase-compensation circuit 30.

The vice-output winding La of the transformer T is connected to the primary-side-phase-compensation circuit 30 via a vice-output diode Da. A anode of the vice-output diode Da is connected to the vice-output winding La. A cathode of the vice-output diode Da is connected to the primary-side-phase-compensation circuit 30. The cathode of the vice-output diode Da is connected to a power-saving capacitor Ca that is grounded.

A first terminal of the secondary-side switch Q3 is connected to a first terminal of the main-output winding Lo via a main output diode D3. A second terminal of the secondary-side switch Q3 is connected to an output terminal of the power supply of the present invention. A voltage provided from the output terminal of the power supply is defined as Vout.

The secondary-side-phase-compensation circuit 50 receives the output voltage Vout from the output terminal of the power supply and receives a setting command (exterior digital command) from outside of the power supply. The secondary-side-phase-compensation circuit 50 sends a feedback result to the secondary-side PWM controller 40. The setting command is adapted to set Vout of the power supply.

A feedback input terminal FB of the secondary-side PWM controller 40 receives the feedback result from the secondary-side-phase-compensation circuit 50, and provides a secondary-side-switch-driving signal (drv) to activate the secondary-side PWM controller 40. A synchronization-signal terminal SYNC of the secondary-side PWM controller 40 is connected to a synchronization circuit 60. The synchronization circuit 60 is connected to the main-output winding Lo to detect a voltage variation from the main-output winding Lo, and provides a synchronization signal to the secondary-side PWM controller 40 according to the voltage variation. Hence, the secondary-side PWM controller 40 can detect the voltage variation from the main-output winding Lo by the synchronization circuit 60, and obtains the working time series of the second driving signal (mdrv) of the primary-side PWM controller 20 according to the voltage variation.

According to a comparison result of a preset value and the feedback result received from the feedback input terminal FB of the primary-side PWM controller 20, a present loading status on a primary output terminal of the secondary side of the transformer T can be determined either as a heavy-loading status, or as a light-loading status or a low-voltage-output status. The following descriptions disclose circuit operations for the two statuses.

(1) Heavy-Loading Status

When the feedback result received from the feedback input terminal FB of the primary-side PWM controller 20 is higher than the preset value, the loading status on the primary output terminal of the secondary side of the transformer T is determined as the heavy-loading status.

Figure 2:
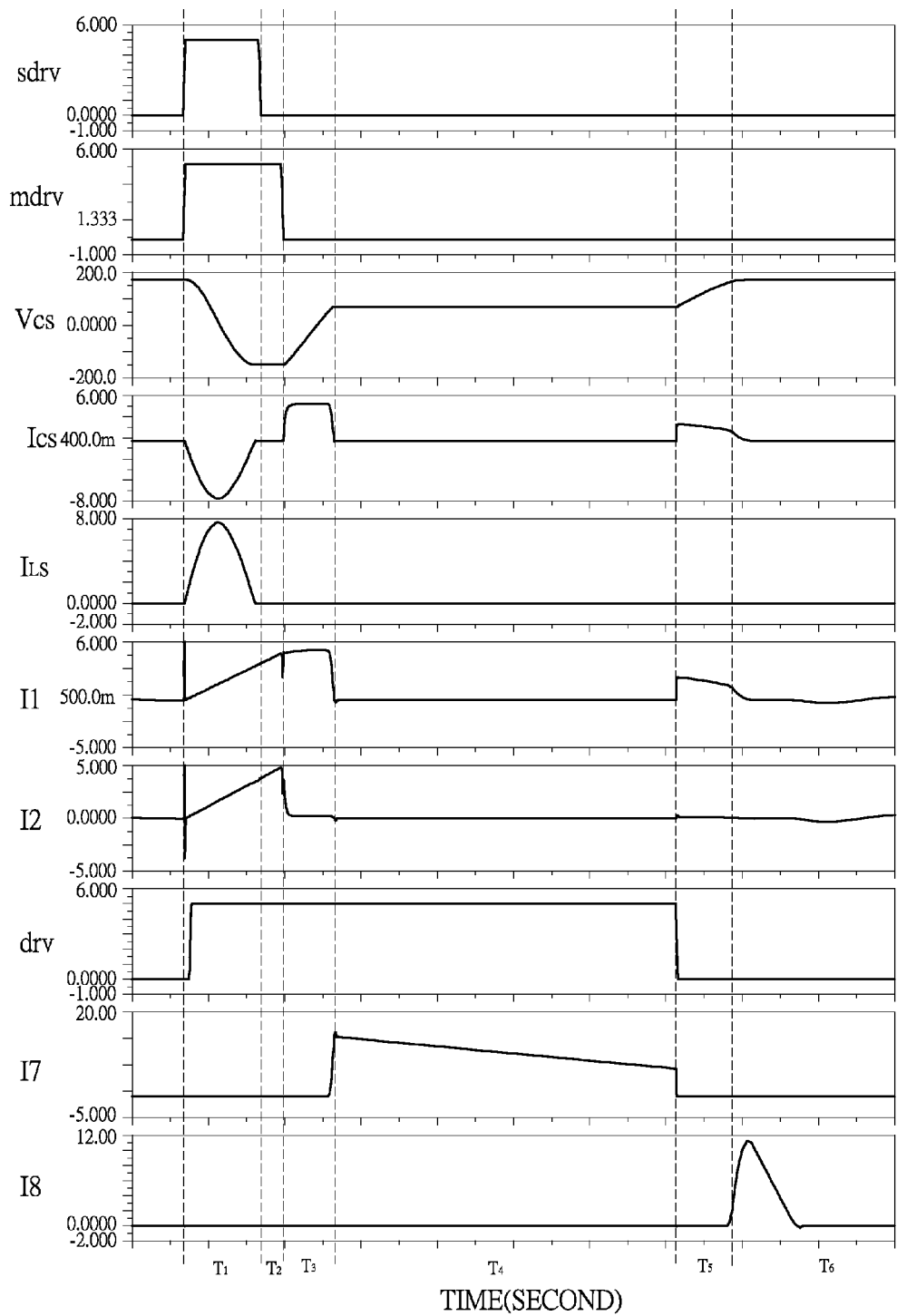
FIG. 2 is a waveform diagram under a heavy-loading status.

With reference to FIG. 2, under the heavy loading status, each switching cycle can be divided into six different time segments T1-T6 for describing circuit operations. Relative voltage waveforms and current waveforms are defined as follows:

sdrv: the first driving signal provided from the primary-side PWM controller 20 to the snubber switch Q1;

mdrv: the second driving signal provided from the primary-side PWM controller 20 to the primary-side switch Q2;

I1: the excitation current flowing through the excitation winding Lp of the transformer T;

I2: the current flowing through the primary-side switch Q2;

Vcs: a voltage drop across the snubber capacitor Cs;

Ics: a current flowing through the snubber capacitor Cs;

$I_{LS}$: a current flowing through the energy-storing inductor Ls;

drv: the secondary-side-switch-driving signal provided from the secondary-side PWM controller 40 to the secondary-side switch Q3;

I7: a current flowing through the main-output winding Lo of the transformer T; and I8: a current flowing through the vice-output winding La of the transformer T.

Figure 4:
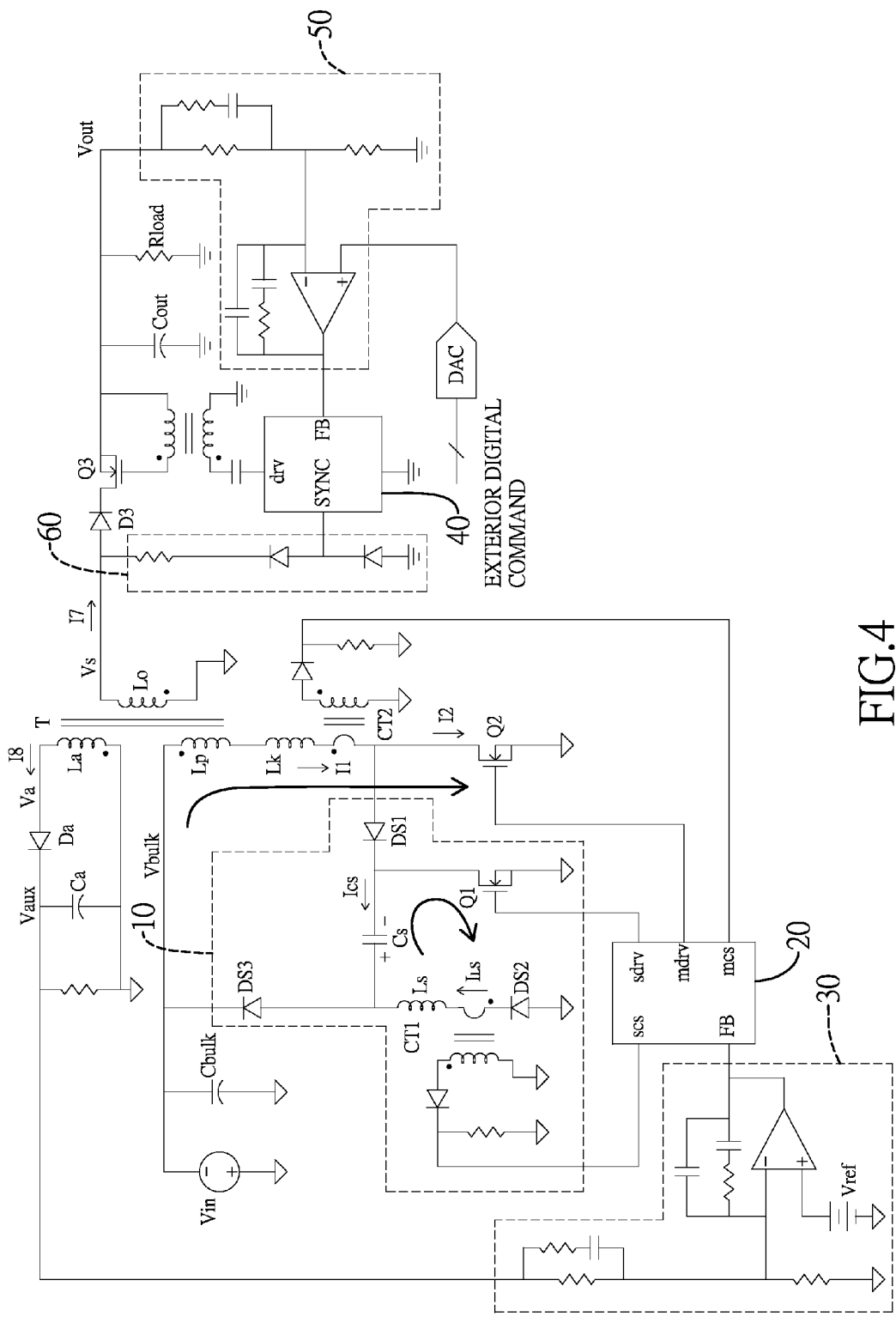
FIG. 4 is a circuit activity diagram during the time segment T1 under the heavy-loading status.
Figure 6:
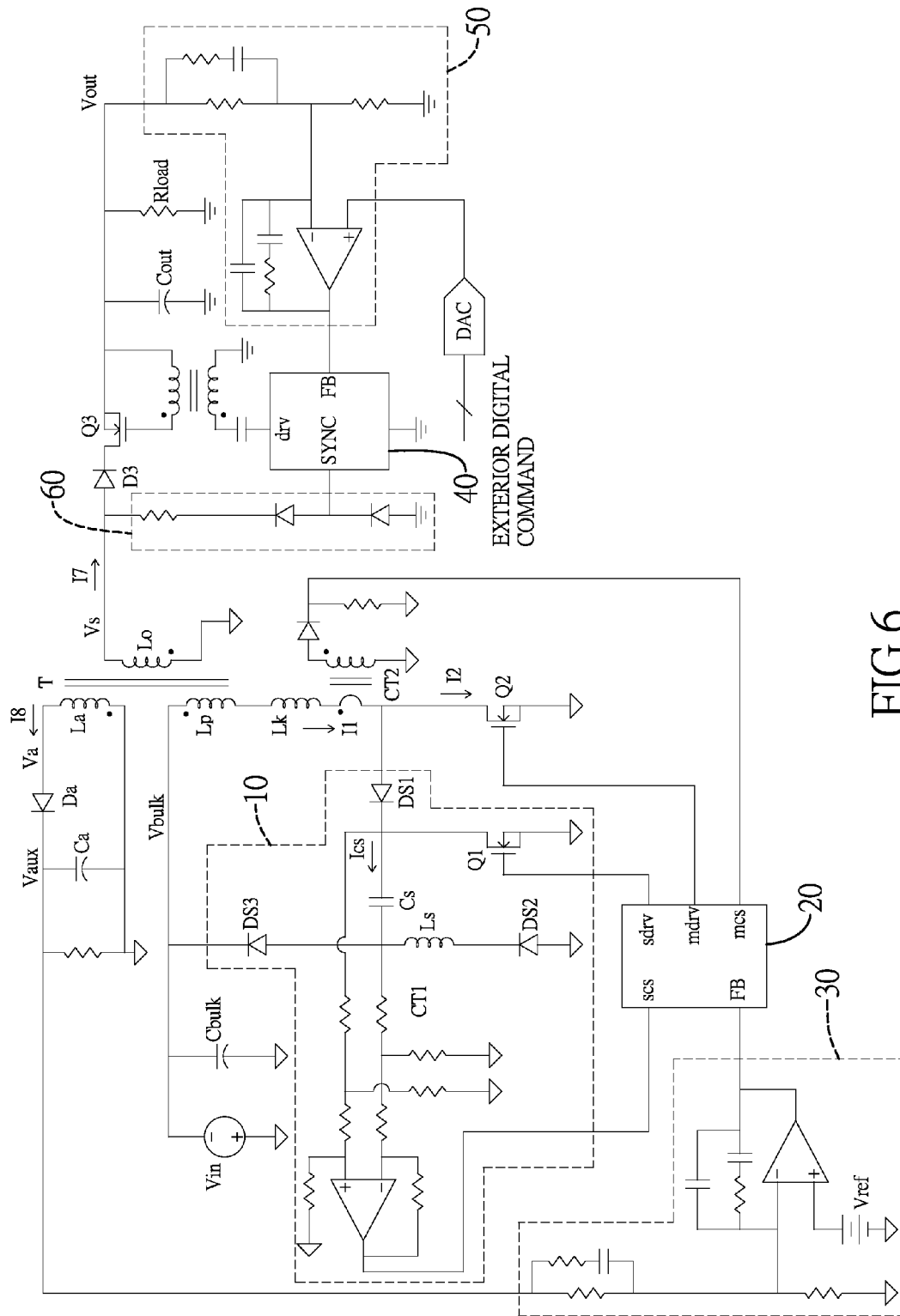
FIG. 6 is a detailed circuit diagram of a second embodiment of the present invention.

At time segment T1, with reference to FIG. 4, the snubber switch Q1 and the primary-side switch Q2 are turned ON at the same time according to the first driving signal (sdrv) and the second driving signal (mdrv) provided from the primary-side PWM controller 20. A current generated from the input power Vin then flows through the excitation winding Lp. At that time, the excitation current I1 of the transformer T is equal to the current I2 flowing through the primary-side switch Q2, such that the transformer T starts to store electricity. Meanwhile, because the snubber switch Q1 is turned ON, the snubber capacitor Cs discharges energy, which is stored in a previous switching cycle, through the snubber switch Q1, the second diode DS2, and the energy-storing inductor Ls. Afterwards, a voltage polarity of the snubber capacitor Cs is gradually turned from positive to negative. Related voltage waveform diagrams and current waveform diagrams, such as $I_{LS}$, Vcs and Ics, are shown in FIG. 2. By means of determining that the current $I_{LS}$ or the voltage Vcs respectively reaches a preset value, the snubber switch Q1 is turned off to terminate the time segment T1. In this embodiment, the first current transformer CT1 senses the current ($I_{LS}$) flowing through the energy-storing inductor Ls, and sends a sensed result to the primary-side PWM controller 20. The primary-side PWM controller 20 thus determines a timing to turn off the snubber switch Q1 according to the current detection result. With reference to FIG. 6 showing another embodiment, the primary-side PWM controller 20 senses a voltage variation of the voltage drop across the snubber capacitor Cs by using a voltage detection circuit, instead of using the first current transformer CT 1 as mentioned above. The voltage sensed by the voltage detection circuit is returned to the input terminal (scs) of the primary-side PWM controller 20.

At time segment T2, a voltage Vaux on the vice-output winding La of the transformer T is returned to the primary-side PWM controller 20 via the primary-side-phase-compensation circuit 30. The primary-side PWM controller 20 thus turns off the primary-side switch Q2 according to Vaux.

Figure 5:
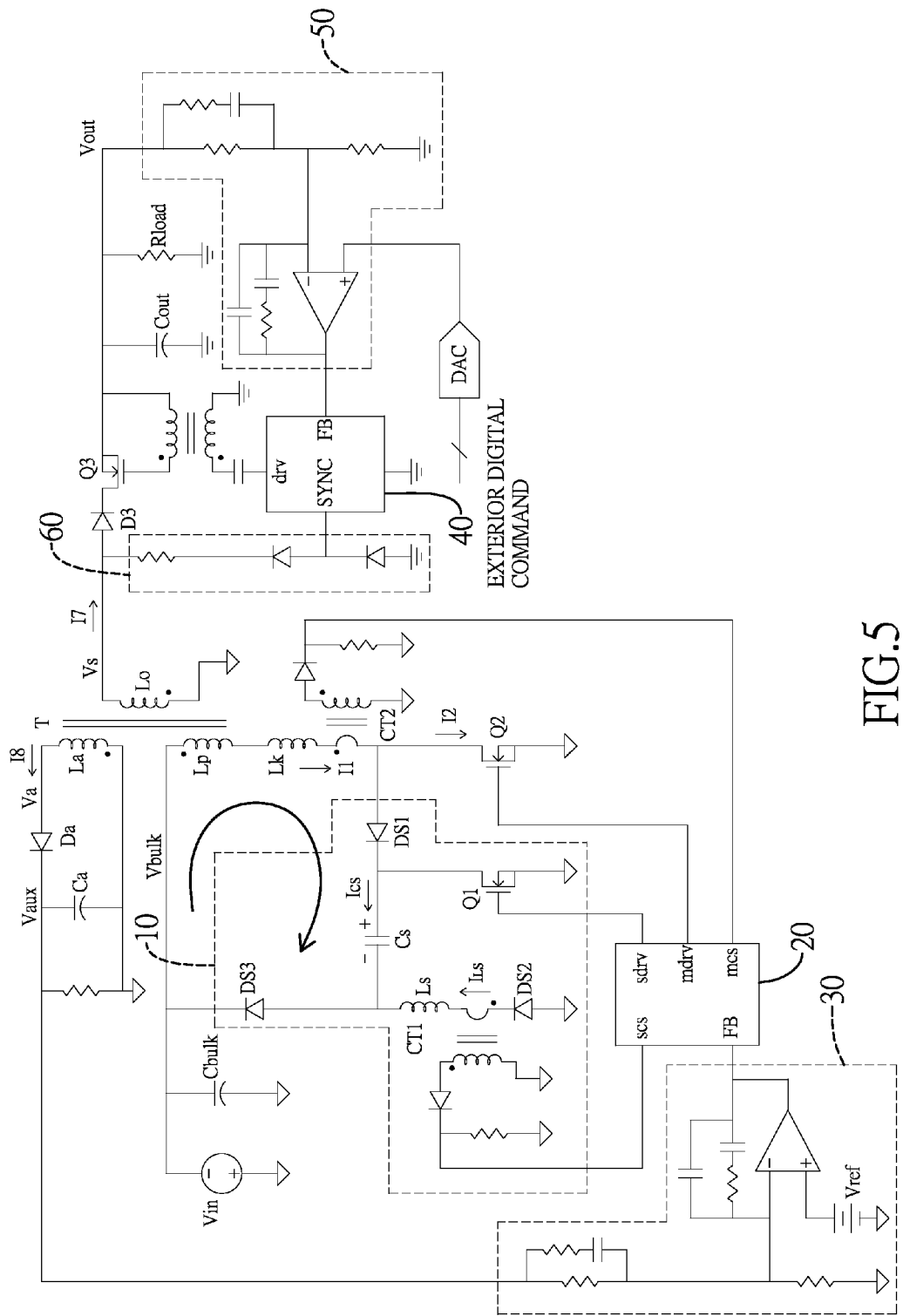
FIG. 5 is a circuit activity diagram during the time segment T3 under the heavy-loading status.

At time segment T3, with reference to FIG. 5, when the primary-side switch Q2 is turned off, the voltage polarities on the excitation winding Lp of the transformer T and the leakage inductor Lk are reversed, and the voltages on the excitation winding Lp and the leakage inductor Lk start to rise. According to the polarity reversion on the primary side of the transformer T, the voltage polarity of the main-output winding Lo on the secondary side of the transformer T is correspondingly reversed, and the voltage on the main-output winding Lo starts to rise. A voltage on the main-output winding Lo is defined as Vs. Vs can be represented as:

$$Vs = Vp \times \frac{Ns}{Np},$$

wherein Vp is a voltage across the excitation winding Lp.

When Vs on the main-output winding Lo is rising to be higher than Vout from the output terminal of the power supply, the main output diode D3 obtains a forward bias, such that the main output diode D3 is turned to a conductive status from a cut-off status. As long as the main output diode D3 is turned on, a voltage level of Vs of the main-output winding Lo is clamped to a voltage level of Vout of the power supply. Because a voltage level of the secondary side of the transformer T is clamped to the voltage level of Vout of the power supply, the voltage Vp across the excitation winding Lp of the primary side of the transformer T is also clamped to a fixed voltage level and forms a flyback voltage. The present voltage Vp across the excitation winding can be represented as $$Vp = Vs \times \frac{Np}{Ns}.$$

Meanwhile, a voltage Va across the vice-output winding La can be represented as $$Va = Vs \times \frac{Na}{Ns}.$$

Va is lower than Vaux, such that the vice-output diode Da is cut off.

For example, when the primary-side switch Q2 is turned off, the excitation current is defined as Ipk1. Based on an inductor-energy-storage equation, the energy stored in the leakage inductor Lk is equal to $$\frac{1}{2} \times Lk \times Ipk1^2.$$

Such energy in the leakage inductor Lk is transferred to the snubber capacitor Cs via a loop comprising the first diode DS1, the snubber capacitor Cs, the third diode DS3, the excitation winding Lp and the leakage inductor Lk.

As to the overall circuit operation at time segment T3, when the primary-side switch Q2 is turned off, the excitation winding Lp and the leakage inductor Lk undergo the polarity reversion, and the voltages on the excitation winding Lp and the leakage inductor Lk begin to rise. The first diode DS1, the snubber capacitor Cs, the third diode DS3, the excitation winding Lp and the leakage inductor Lk construct a loop. The electricity previously stored in the snubber capacitor Cs during the time segment T1 is now returned to the transformer T, and the snubber capacitor Cs further absorbs electricity from the flyback voltage (Vs*Np/Ns) on the excitation winding Lp and from the leakage inductor Lk. The voltage polarity of the voltage drop across the snubber capacitor Cs is thus turned from negative to positive. When the voltage drop across the snubber capacitor Cs is higher than Vs*Np/Ns, the main output diode D3 is turned on. After the energy in the leakage inductor Lk is transferred, the snubber capacitor Cs stops being charged. A present voltage drop Vcs across the snubber capacitor Cs approximates $$Vcs = \sqrt{\frac{Lk}{Cs} \times Ipk1^2 + \left(Vs \times \frac{Np}{Ns}\right)^2}.$$

At time segment T4, with reference to the waveform diagram of the secondary-side-switch-driving signal (drv) generated from the secondary-side switch Q3, the secondary-side PWM controller 40 obtains conducting timings of the snubber switch Q1 and the primary-side switch Q2 at the time segment T1 according to a voltage sensed by the synchronization circuit 60, and determines that the snubber switch Q1 and the primary-side switch Q2 are turned on before the secondary-side switch Q3 is turned on by the secondary-side-switch-driving signal (drv). However, the winding directions of the primary side winding and the secondary side winding of the transformer T are inverse to each other. When the snubber switch Q1 and the primary-side switch Q2 are turned on, the main output diode D3 that is reversely biased is turned off. Although the secondary-side switch Q3 is turned on, the main-output winding Lo still does not output a current.

After the snubber capacitor Cs is charged by the excitation winding Lp and the leakage inductor Lk, the main output diode D3 is then turned on. The main-output winding Lo of the transformer T releases energy to charge an energy-storing capacitor Cout connected to the main-output winding Lo. A waveform diagram of the current flowing through the main-output winding Lo is illustrated as I7 in FIG. 2. The secondary-side-phase-compensation circuit 50 compares the sensed output voltage Vout of the power supply with the setting command from outside to obtain a comparison result. The comparison result is returned to the secondary-side PWM controller 40 to turn off the secondary-side switch Q3. The time segment T4 is then terminated.

At time segment T5, after the secondary-side switch Q3 is turned off, the energy stored in the excitation winding Lp and the leakage inductor Lk is transferred again. Similar to the time segment T3, such energy is transferred to the snubber capacitor Cs via the loop comprising the first diode DS1, the snubber capacitor Cs, the third diode DS3, the excitation winding Lp and the leakage inductor Lk. A difference between the time segments T3 and T5 is magnitude of the transferred energy. At the time segment T5, the flyback voltage on the excitation winding Lp is $$Va \times \frac{Np}{Na}.$$

After the secondary-side switch Q3 is turned off, an exciting current is defined as Ipk2. The voltage Vcs on the snubber capacitor Cs is represented as $$Vcs = \sqrt{\frac{Lk}{Cs} \times Ipk2^2 + \left(Va \times \frac{Np}{Na}\right)^2}.$$

At a time segment T6, after the excitation winding Lp and the leakage inductor Lk finish charging the snubber capacitor Cs, the vice-output diode Da is then turned on. Afterward, the vice-output winding La discharges electricity to the snubber capacitor Ca until a next switching cycle, wherein a discharging current of the vice-output winding La is illustrated as I8 in FIG. 2.

The circuit activities at time segments T1-T6 mentioned above are operated under heavy-loading status.

(2) Light-Loading Status or Low-Voltage-Output Status

When the feedback result received from the feedback input terminal FB of the primary-side PWM controller 20 is lower than the preset value, the primary-side PWM controller 20 identifies the light-loading status. Vout of the power supply is defined as 0.1V as an example.

Figure 3:
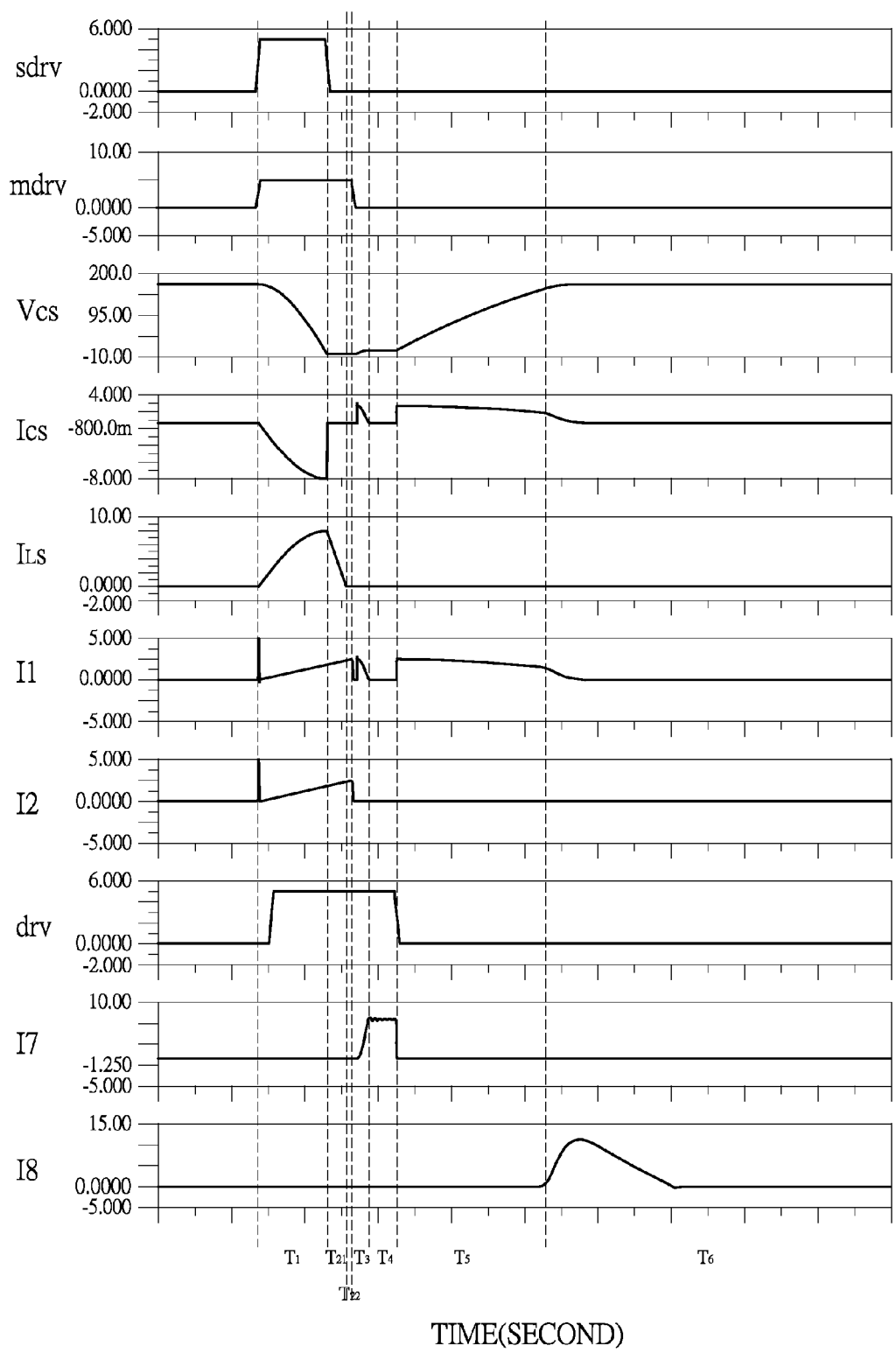
FIG. 3 is a waveform diagram under a light-loading status or a low-voltage-output status.

With reference to FIG. 3, under the light-loading status, each switching cycle can be divided into multiple time segments of different durations T1, T21, T22, T3-T6 for describing circuit activities. Relative voltage waveforms and current waveforms are the same as the heavy-loading status as mentioned above, and are not described here.

At the time segment T1, the snubber switch Q1 and the primary-side switch Q2 are turned ON at a same time according to the first driving signal (sdrv) and the second driving signal (mdrv) provided from the primary-side PWM controller 20. The current generated from the input power Vin then flows through the excitation winding Lp. At that time, the excitation current I1 of the transformer T is equal to the current I2 flowing through the primary-side switch Q2, such that the transformer T starts to store electricity. Meanwhile, the energy stored in the snubber capacitor Cs, which is stored in a previous switching cycle, is transferred to the energy-storing inductor Ls. Related voltage waveform diagrams and current waveform diagrams, such as $I_{Ls}$, Vcs and Ics, are shown in FIG. 3. When the primary-side PWM controller 20 determines that the current ($I_{Ls}$) flowing through the energy-storing inductor Ls is increased to a peak, or the voltage Vcs on the snubber capacitor Cs is 0V, the primary-side PWM controller 20 turns off the snubber switch Q1. The time segment T1 is then terminated.

At time segment T21, after the snubber switch Q1 is turned off, the voltage across the energy-storing inductor Ls keeps being increased until the second diode DS2 and the third diode DS3 are turned to be clamped to a voltage level of an input voltage (Vbulk) of the primary side of the transformer T. Because the diodes DS2, DS3 are turned on, the energy-storing inductor Ls discharges electricity to the input capacitor Cbulk. Hence, the energy originally stored in the energy-storing inductor Ls can be recycled to the input terminal of the transformer T.

At time segment T22, after the voltage Vaux generated from the vice-output winding La of the transformer T is returned to the primary-side PWM controller 20 via the primary-side-phase-compensation circuit 30, the primary-side switch Q2 is then turned off.

At time segment T3, after the primary-side switch Q2 is turned off, the energy stored in the excitation winding Lp and the leakage inductor Lk on the primary side of the transformer T is transferred to the snubber capacitor Cs via the loop comprising the first diode DS1, the snubber capacitor Cs, the third diode DS3, the excitation winding Lp and the leakage inductor Lk, such that the circuit activity here is similar to the circuit activity at the time segment T3 under the heavy-loading status. Because the snubber capacitor Cs is discharged completely during the time segment T1, the voltage Vcs on the snubber capacitor Cs approximates 0V. Hence, after the primary-side switch Q2 is turned off, there is no energy to be returned to the transformer T. The transformer T obtains energy only from the excitation winding Lp and the leakage inductor Lk. The waveform diagrams of Vcs and Ics are illustrated in FIG. 3. The waveform diagrams in FIG. 3 are obtained under a condition that Vout of the power supply is 0.1V. The voltage Vcs on the snubber capacitor can be represented as $$Vcs = \sqrt{\frac{Lk}{Cs} \times Ipk1^2 + \left(Vs \times \frac{Np}{Ns}\right)^2}.$$

At this time, Vs on the main-output winding approximates a summation of Vout of the power supply and a forward bias Vf of the main output diode D3, wherein Vs≅Vout+Vf. According to the representation of Vcs, obviously, the energy obtained by the snubber capacitor Cs is contributed from the leakage inductor Lk of the transformer T. The voltage Vcs on the snubber capacitor during the time segment T3 is much lower.

Figure 8A:
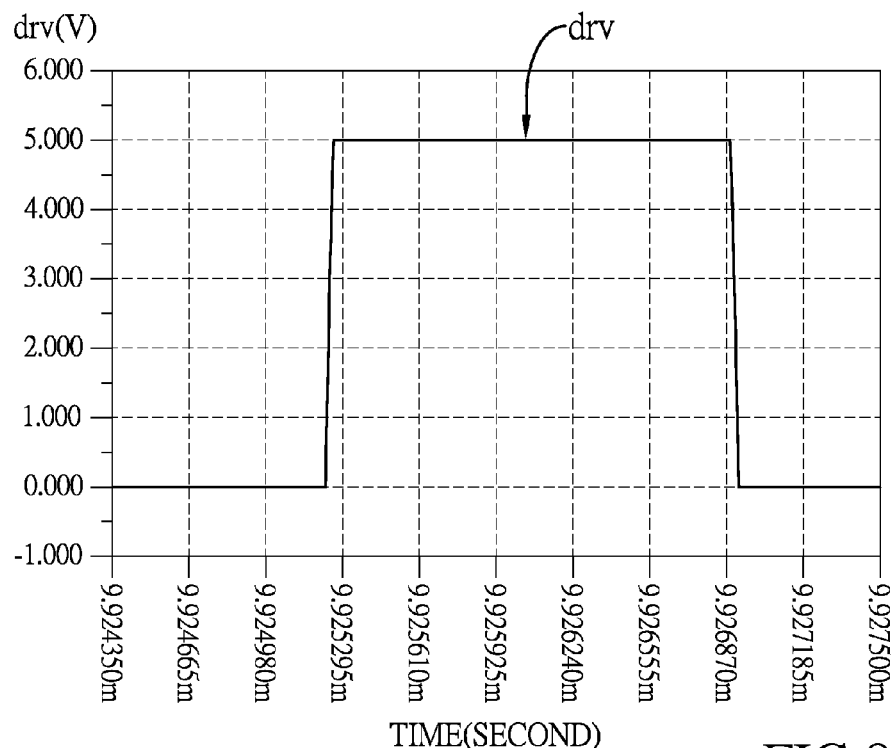
FIG. 8A is a waveform diagram of the secondary-side-switch-driving signal under the light-loading status.
Figure 8B:
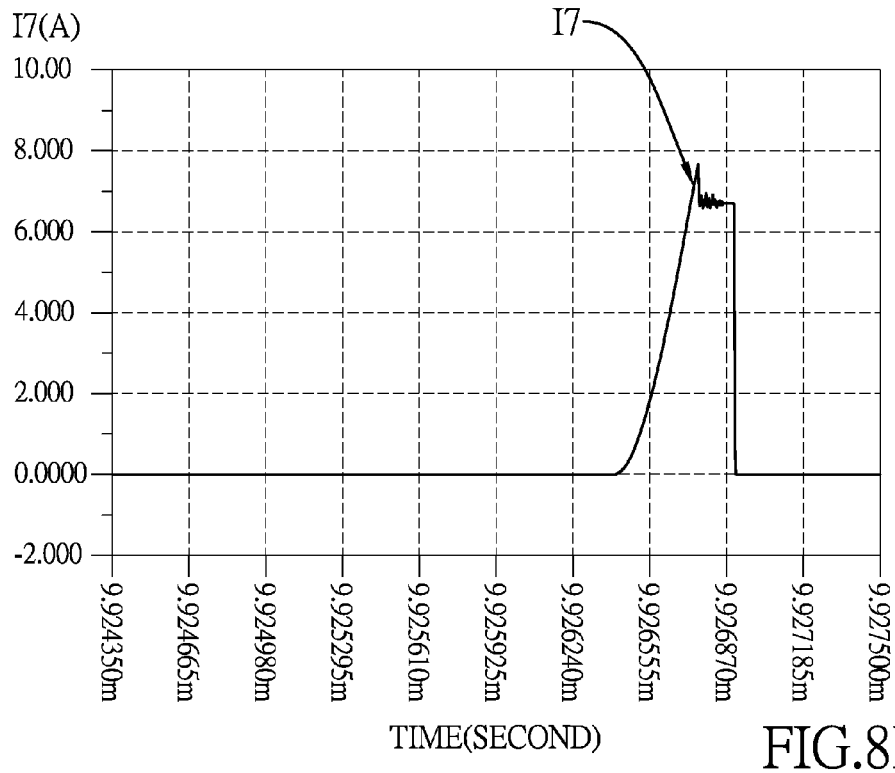
FIG. 8B is a waveform diagram of the current I7 flowing through the main-output winding under the light-loading status.

The circuit activities during time segments T4-T6 are the same as those during the time segments T4-T6 under the heavy-loading status. With reference to FIGS. 8A and 8B, in the working time series of the present invention, the secondary-side switch Q3 is firstly turned on for a period of time. Afterward, the main output diode D3 is turned on and the time duration for turning on the secondary-side switch Q3 is thus relatively not limited. Even the secondary side of the transformer T is controlled to output a very low output voltage Vout, a time duration for turning on the secondary-side switch Q3 needs not be decreased to very short on purpose to avoid instability induced by the secondary-side switch Q3. On contrary, under the condition that the secondary-side switch Q3 has enough time for being turned on, by controlling a timing to turn off the secondary-side switch Q3 to limit the current (I7), the secondary side of the transformer T can provide a very low output voltage. The timing to turn off the secondary-side switch Q3 can be precisely controlled by the secondary-side-phase-compensation circuit 50.

The circuit activities under the heavy-loading status and the light-loading status are respectively described. However, when a variation of the loading status occurs, the present invention can identify a present loading status and adjust a voltage by using a feedback method. For example, assuming that the energy stored in the transformer T during the time segment T1 is fixed, when the load is turned to the heavy-loading status from the light-loading status, the time segment T4 is extended by a feedback control. The energy-storing capacitor Cout can store more electricity to stabilize the output voltage. The electricity of the transformer T remaining at the time segment T6 is relatively decreased. Time to charge the energy-storing capacitor Ca is shortened, causing the voltage Vaux to be decreased. The primary-side-phase-compensation circuit 30 then automatically adjusts the next time segment T1 until the output voltage Vout of the power supply reaches a preset voltage.

Assuming that the energy stored in the transformer T during the time segment T1 is fixed, when the load is turned to the light-loading status from the heavy-loading status, the time segment T4 is shortened by a feedback control. The energy-storing capacitor Cout can store less electricity to stabilize the output voltage. The electricity of the transformer T remaining at the time segment T6 is relatively increased. Time to charge the energy-storing capacitor Ca is extended, causing the voltage Vaux to be increased. The primary-side-phase-compensation circuit 30 then automatically adjusts the next time segment T1 until the output voltage Vout of the power supply reaches a preset voltage. From the description above, in the present invention, the secondary-side PWM controller 40 is a guiding component in an overall feedback control. The primary-side PWM controller 20 is indirectly controlled by the secondary-side PWM controller 40.

Under a condition that the present invention stably works, because a reference voltage Vref for controlling the voltage Vaux is fixed, the voltage Vaux is then fixed. If a small load is provided on a terminal of Vaux, the time duration of the time segment T6 can be fixed. The time duration of the time segment T6 is not affected by the output voltage or a floating load. Moreover, the snubber capacitor Cs extracts a fixed electricity from the transformer T by $$\frac{1}{2} \times Cs \times \left(Va \times \frac{Np}{Na}\right)^2 + \frac{1}{2} \times Lk \times Ipk2^2.$$

Hence, the time duration of the time segment T1 is maintained despite a magnitude of the output voltage Vout of the power supply. The snubber switch Q1 and the primary-side switch Q2 each respectively have enough time for being turned on.

Figure 9A:
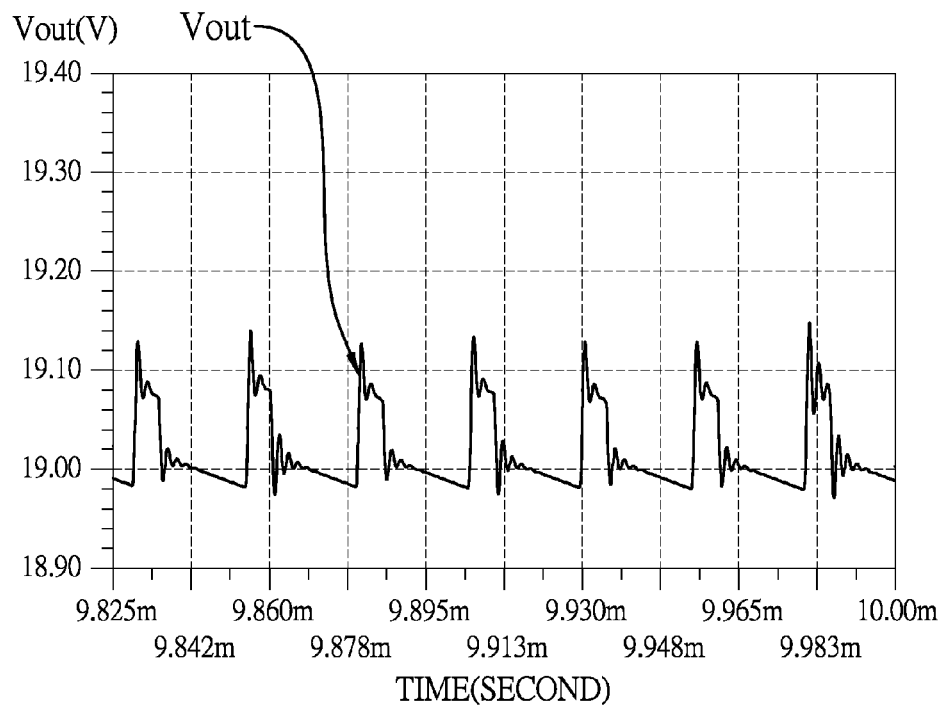
FIG. 9A is a waveform diagram of the output voltage Vout under the heavy-loading status.
Figure 9B:
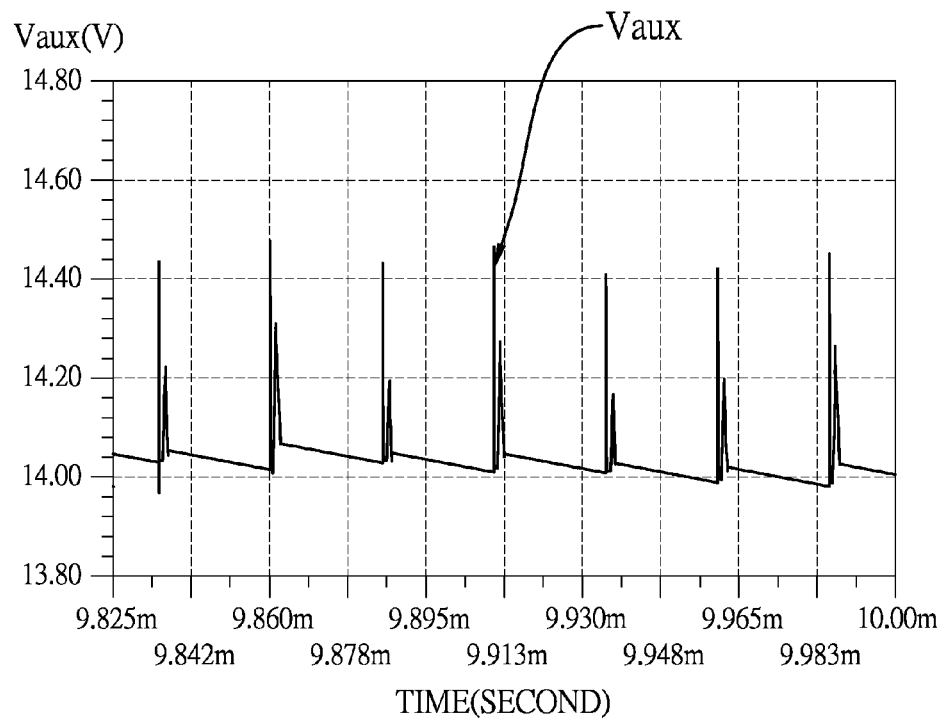
FIG. 9B is a waveform diagram of the output voltage Vaux under the heavy-loading status.
Figure 10A:
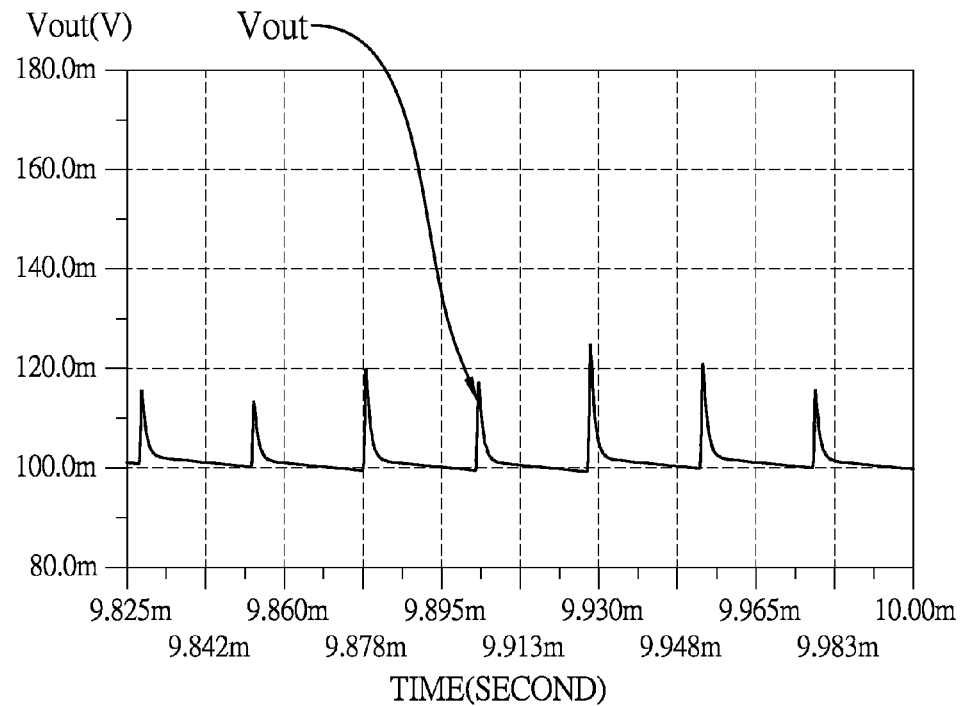
FIG. 10A is a waveform diagram of the output voltage Vout under the light-loading status.
Figure 10B:
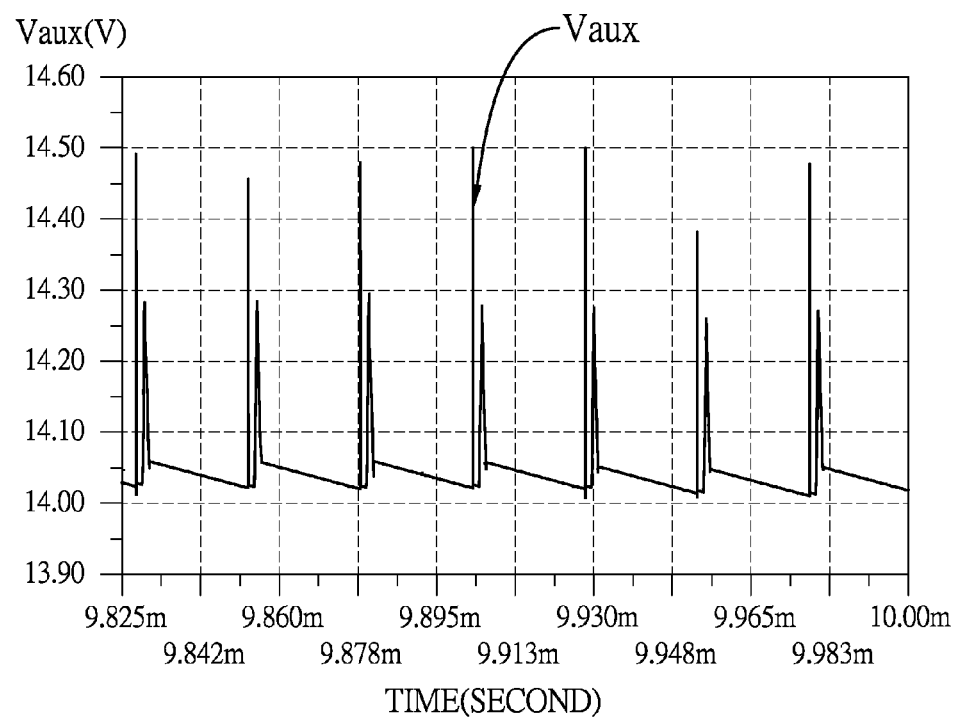
FIG. 10B is a waveform diagram of the output voltage Vaux under the light-loading status.
Figure 11:
FIG. 11 is a waveform diagram of PWM control signals.
Figure 11:
Figure 12:
FIG. 12 is a waveform diagram of PWM control signals.
Figure 12:
Figure 13:
FIG. 13 is a waveform diagram of burst-mode PWM control signals.
Figure 13:

In conclusion, when the time segment T5 is terminated, the voltage Vcs on the energy-storing capacitor Cs is $$Vcs = \sqrt{\frac{Lk}{Cs} \times Ipk2^2 + \left(Va \times \frac{Np}{Na}\right)^2}$$

under the light-loading status and the heavy-loading status. No matter how much the output voltage Vout of the power supply, by following a basic principle of $$\left(Vs \times \frac{Na}{Ns}\right) < Va,$$

the output voltage Vout of the power supply of the present invention can be kept at a stable switching frequency without a skip-cycle to achieve an object of stable feedback control. For example, with reference to FIGS. 9A and 9B, under the heavy-loading status, the output voltage Vout of the power supply of the present invention is set to 19V, and the voltage Vaux approximates 14V. With reference to FIGS. 10A and 10B, under the light-loading status, although the output voltage Vout of the power supply is set to a very low value of 0.1V, the switching frequency is still fixed and the skip-cycle does not occur.

Figure 7:
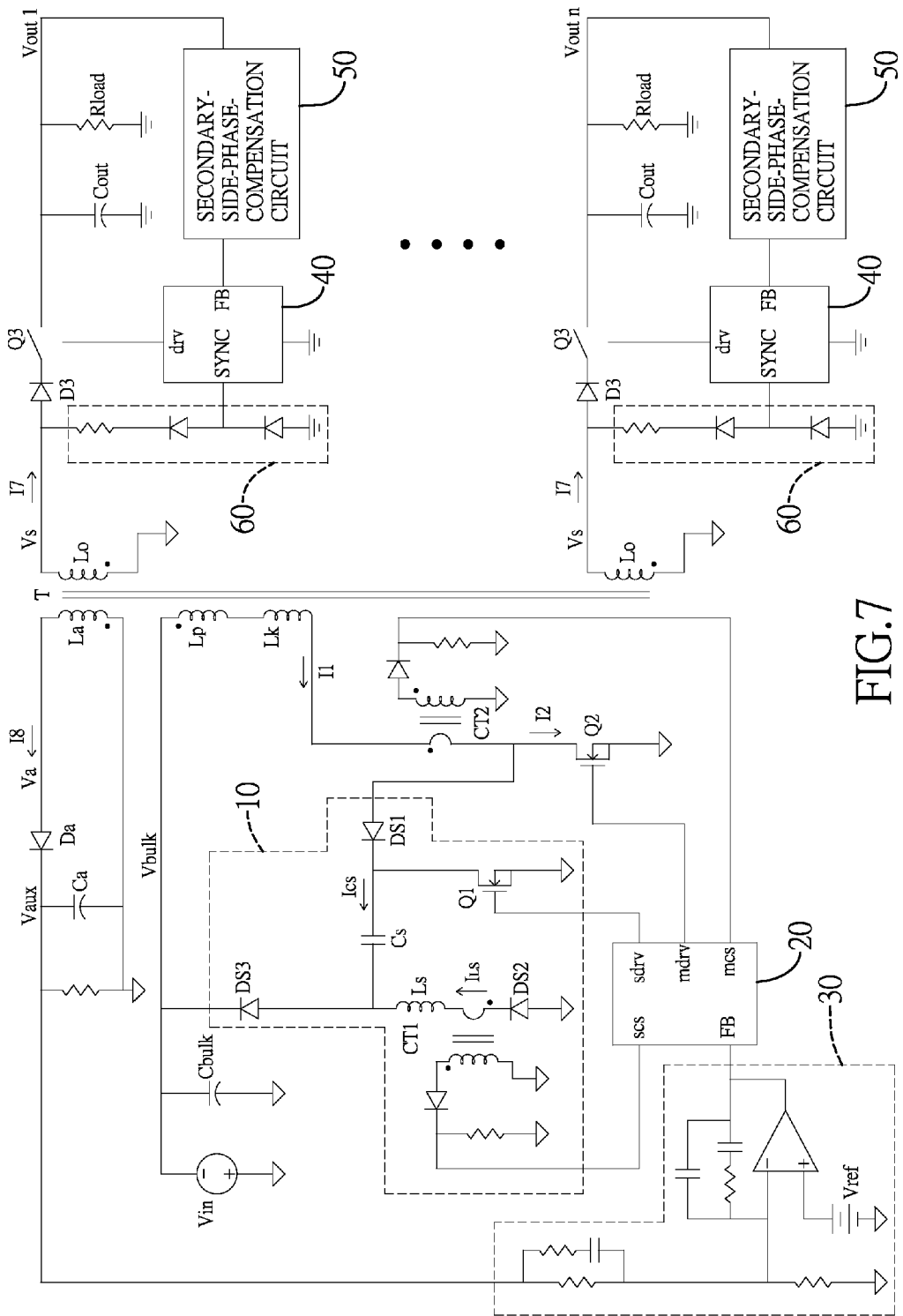
FIG. 7 is a circuit block diagram of a third embodiment for providing multiple output voltages.

With reference to FIG. 7, a circuit diagram of a third embodiment of the present invention is illustrated. A circuit structure on the primary side of the transformer T in the third embodiment is the same as that of FIG. 1. But the secondary side of the transformer T has multiple main-output windings Lo and multiple circuit units co-operating with the main-output windings Lo. Therefore, the third embodiment of the present invention can provide multiple output voltages (Vout 1)-(Vout n).

What is claimed is:

1. A switched-mode power supply for providing a stable output voltage, the switched-mode power supply comprising:
a transformer having:
a primary side having an excitation winding and a vice-output winding of Na turns, wherein a first terminal of the excitation winding is connected to an input power and an input capacitor, the vice-output winding is connected to a primary-side-phase-compensation circuit via a vice-output diode, and a cathode of the vice-output diode is connected to a power-saving capacitor that is grounded; and
a secondary side having a main-output winding of Ns turns;
a ratio of turns of the transformer meeting $$\left(Vs \times \frac{Na}{Ns}\right) < Va,$$

wherein Vs is a voltage of the main-output winding, and Va is a voltage of the vice-output winding;
a primary-side switch connected between the excitation winding of the transformer and a ground in series;
an active snubber circuit having a first diode, a second diode, a third diode, a snubber capacitor, an energy-storing inductor and a snubber switch, wherein
the second diode, the energy-storing inductor and the third diode are sequentially connected in series and connected to the input power;
the snubber capacitor has a first terminal connected to a node between the third diode and the energy-storing inductor, and a second terminal connected to a node between the primary-side switch and the excitation winding via the first diode;
the snubber switch has a first terminal connected to a node between the snubber capacitor and the first diode, and a second terminal connected to the ground;
a primary-side pulse width modulation (PWM) controller connected to the snubber switch and the primary-side switch to respectively provide a first driving signal and a second driving signal to the snubber switch and the primary-side switch;
a secondary-side switch connected between the main-output winding and an output terminal;
a secondary-side-phase-compensation circuit receiving an output voltage from the output terminal and a setting command from outside, and comparing the output voltage with the setting command;
a secondary-side PWM controller receiving a comparison result from the secondary-side-phase-compensation circuit and providing a secondary-side-switch-driving signal to control the secondary-side switch; and
a synchronization circuit connected to the main-output winding to detect a voltage variation from the main-output winding and providing a synchronization signal to the secondary-side PWM controller according to the voltage variation.

2. The switched-mode power supply as claimed in claim 1 further comprising:
a first current transformer connected to the energy-storing inductor to sense a current flowing through the energy-storing inductor and to send a sensed result to the primary-side PWM controller; and
a second current transformer connected between the primary-side switch and the excitation winding in series to sense an excitation current flowing through the excitation winding and to send another sensed result to the primary-side PWM controller.

3. The switched-mode power supply as claimed in claim 2, wherein the primary-side PWM controller compares a feedback result received from the primary-side-phase-compensation circuit with a preset value to determine a load status on the output terminal.

4. The switched-mode power supply as claimed in claim 3, wherein the setting command received by the secondary-side-phase-compensation circuit is for setting the output voltage.

5. The switched-mode power supply as claimed in claim 4, wherein during a same switching cycle, the snubber switch, the primary-side switch and the secondary-side switch are synchronously turned on; and the snubber switch, the primary-side switch and the secondary-side switch are sequentially turned off.

6. The switched-mode power supply as claimed in claim 1 further comprising:
 a voltage detection circuit detecting a voltage drop across the snubber capacitor and sending the detected voltage drop to the primary-side PWM controller; and
 a second current transformer connected between the primary-side switch and the excitation winding in series to sense an excitation current flowing through the excitation winding and to send a sensed result to the primary-side PWM controller.

7. The switched-mode power supply as claimed in claim 6, wherein the primary-side PWM controller compares a feedback result received from the primary-side-phase-compensation circuit with a preset value to determine a load status on the output terminal.

8. The switched-mode power supply as claimed in claim 7, wherein the setting command received by the secondary-side-phase-compensation circuit is for setting the output voltage.

9. The switched-mode power supply as claimed in claim 8, wherein during a same switching cycle, the snubber switch, the primary-side switch and the secondary-side switch are synchronously turned on; and the snubber switch, the primary-side switch and the secondary-side switch are sequentially turned off.

10. The switched-mode power supply as claimed in claim 1, wherein the primary-side PWM controller compares a feedback result received from the primary-side-phase-compensation circuit with a preset value to determine a load status on the output terminal.

11. The switched-mode power supply as claimed in claim 10, wherein the setting command received by the secondary-side-phase-compensation circuit is for setting the output voltage.

12. The switched-mode power supply as claimed in claim 11, wherein during a same switching cycle, the snubber switch, the primary-side switch and the secondary-side switch are synchronously turned on; and the snubber switch, the primary-side switch and the secondary-side switch are sequentially turned off.

* * * * *